(12) United States Patent
Sasaki

(10) Patent No.: US 9,334,593 B2
(45) Date of Patent: May 10, 2016

(54) APPARATUS FOR MANUFACTURING A NETTED STRUCTURE AND METHOD FOR MANUFACTURING A NETTED STRUCTURE

(75) Inventor: Hiroyuki Sasaki, Aichi-ken (JP)

(73) Assignee: Airweave Manufacturing Inc., Aichi-Ken (JP)

( * ) Notice: Subject to any disclaimer, the term of this patent is extended or adjusted under 35 U.S.C. 154(b) by 301 days.

(21) Appl. No.: 13/635,957

(22) PCT Filed: Sep. 9, 2011

(86) PCT No.: PCT/JP2011/005094
§ 371 (c)(1),
(2), (4) Date: Nov. 15, 2012

(87) PCT Pub. No.: WO2012/035736
PCT Pub. Date: Mar. 22, 2012

(65) Prior Publication Data
US 2013/0161858 A1    Jun. 27, 2013

(30) Foreign Application Priority Data

Sep. 15, 2010 (JP) ................................. 2010-207387

(51) Int. Cl.
*B29B 13/04* (2006.01)
*B29C 47/88* (2006.01)
*D04H 3/03* (2012.01)
*D04H 3/037* (2012.01)
*B29C 47/00* (2006.01)
(Continued)

(52) U.S. Cl.
CPC  *D04H 3/03* (2013.01); *B29B 13/04* (2013.01); *D04H 3/037* (2013.01); *D04H 3/16* (2013.01); *B29C 43/02* (2013.01); *B29C 43/22* (2013.01); *B29C 47/0014* (2013.01); *B29C 47/0019* (2013.01); *B29C 47/0033* (2013.01); *B29C 47/084* (2013.01); *B29C 47/12* (2013.01); *B29C 47/126* (2013.01); *B29C 47/30* (2013.01); *B29C 47/884* (2013.01); *B29C 47/885* (2013.01); *B29C 47/888* (2013.01); *B29C 47/8815* (2013.01); *D02G 1/006* (2013.01); *D04H 3/045* (2013.01); *D04H 3/07* (2013.01); *D04H 3/163* (2013.01)

(58) Field of Classification Search
None
See application file for complete search history.

(56) References Cited

U.S. PATENT DOCUMENTS 2,719,352 A * 10/1955 Drummond et al. ............... 226/1
3,512,230 A *  5/1970 Luzzatto ......................... 28/103
(Continued)

FOREIGN PATENT DOCUMENTS

EP    1 270 787 A1    1/2003
EP    1 586 687 A1   10/2005
(Continued)

*Primary Examiner* — Jeffrey Wollschlager
(74) *Attorney, Agent, or Firm* — Fitch, Even, Tabin and Flannery LLP

(57) ABSTRACT

The purpose of the invention is to eliminate water-permeable sheets and thus to eliminate various bothersome works related to the water-permeable sheets.
To achieve the purpose, the surfaces of the chutes 21, 22 are roughened by sandblasting. The chutes 21, 22 are made of metal such as stainless steel, for example. Processed metal surfaces are generally smooth with almost no friction. Moreover, metal has its inherent water repellency. If water is flowed on a bare metal surface, some parts do not get wet while some parts have concentrated surge water flow thereon. However, by sandblasting the surfaces of the chutes 21, 22, adequate friction resistance is generated and inherent water repellency of metal is eliminated.

1 Claim, 5 Drawing Sheets

(51) Int. Cl.
  *D04H 3/07* (2012.01)
  *D04H 3/16* (2006.01)
  *B29C 43/02* (2006.01)
  *B29C 47/12* (2006.01)
  *B29C 47/30* (2006.01)
  *B29C 43/22* (2006.01)
  *D04H 3/045* (2012.01)
  *D02G 1/00* (2006.01)
  *B29C 47/08* (2006.01)

(56) References Cited

U.S. PATENT DOCUMENTS

| | | | | |
|---|---|---|---|---|
| 3,691,004 | A | * | 9/1972 | Werner et al. ............ D04H 3/16 156/167 |
| 3,810,280 | A | * | 5/1974 | Walton et al. .................. 26/18.6 |
| 3,837,988 | A | * | 9/1974 | Hennen et al. .................. 428/92 |
| 3,936,337 | A | * | 2/1976 | Stapp ............................ 156/167 |
| 4,212,692 | A | * | 7/1980 | Rasen et al. ................. 156/167 |
| 4,227,350 | A | * | 10/1980 | Fitzer ............................. 51/295 |
| 4,351,683 | A | * | 9/1982 | Kusilek ........................ 156/167 |
| 4,634,485 | A | * | 1/1987 | Welygan et al. .......... 156/244.11 |
| 4,735,849 | A | * | 4/1988 | Murakami et al. ............ 442/363 |
| 4,810,556 | A | * | 3/1989 | Kobayashi et al. ........... 428/152 |
| 4,859,516 | A | * | 8/1989 | Yamanaka et al. .............. 428/92 |
| 4,913,757 | A | * | 4/1990 | Yamanaka et al. ............ 156/167 |
| 4,952,265 | A | * | 8/1990 | Yamanaka .......... A47G 27/0212 156/167 |
| 5,346,757 | A | * | 9/1994 | Nakata ............................ 428/88 |
| 5,464,491 | A | * | 11/1995 | Yamanaka .................... 156/167 |
| 5,639,543 | A | * | 6/1997 | Isoda et al. .................... 428/220 |
| 5,733,825 | A | * | 3/1998 | Martin et al. ................. 442/361 |
| 5,961,234 | A | * | 10/1999 | Uchikata ....................... 400/636 |
| 7,377,762 | B2 | * | 5/2008 | Nishibori et al. ................ 425/71 |
| 7,625,629 | B2 | * | 12/2009 | Takaoka ........................ 428/220 |
| 8,226,882 | B2 | * | 7/2012 | Takaoka ........................ 264/622 |
| 8,563,121 | B2 | * | 10/2013 | Takaoka ........................ 428/218 |
| 2003/0092335 | A1 | * | 5/2003 | Takaoka ............................ 442/1 |
| 2003/0198420 | A1 | * | 10/2003 | Matsuyama .......... F16C 19/225 384/565 |
| 2004/0042379 | A1 | * | 3/2004 | Schoeppel ............... G11B 7/24 369/275.1 |
| 2009/0163877 | A1 | * | 6/2009 | Christoffersen .... A61M 5/3286 604/240 |
| 2009/0269571 | A1 | * | 10/2009 | Takaoka ........................ 428/222 |
| 2011/0196124 | A1 | * | 8/2011 | Kurachi ................. B29C 39/00 528/332 |
| 2011/0316185 | A1 | * | 12/2011 | Takaoka ........................ 264/112 |
| 2012/0104646 | A1 | | 5/2012 | Takaoka |

FOREIGN PATENT DOCUMENTS

| | | |
|---|---|---|
| EP | 2 045 401 A1 | 4/2009 |
| GB | 1154465 | 6/1969 |
| JP | 2006-97223 | 4/2006 |
| JP | 2008-25298 | 2/2008 |
| JP | 4181878 | 9/2008 |
| WO | WO 01/68967 A1 | 9/2001 |
| WO | WO 2012/157289 A1 | 11/2012 |

\* cited by examiner (a)

(b)

Enlarged view of the part enclosed by the dotted line

APPARATUS FOR MANUFACTURING A NETTED STRUCTURE AND METHOD FOR MANUFACTURING A NETTED STRUCTURE

BACKGROUND OF THE INVENTION

1. Field of the Invention

This invention relates to an apparatus for manufacturing a netted structure which receives part of a filament assembly of molten resin before it lands on a water surface of a water tank and narrows the thickness of the filament assembly so as to form surface layers of the netted structure, and a method for manufacturing a netted structure.

2. Brief Description of the Related Arts

A netted structure manufactured by helically and randomly entangling a plurality of filaments made of a thermoplastic resin such as polyethylene as a main material, and partly and thermally bonding the filaments are known in prior art. Such a netted structure, carrying countless numbers of voids among filaments, is used for a bedding mat, a cushion or a buffer due to their high shock absorbing property.

A method for manufacturing such a netted structure first stores a molten resin in a container called a die. A metal plate having a number of holes is provided on a lower face of the die. Filaments are formed by extruding the molten resin through those holes and free-fall to a water tank located below. After landing on water, the filaments are varied in velocity by buoyancy and resistance of water, are solidified by being cooled and thus are helically and randomly entangled and partly and thermally bonded in water as described above.

By the way, it is known that making the apparent density of the surface layers of the netted structure higher than that of the inner layer has a good effect for comfort and permanent set-in fatigue resistance when using the netted structure as a bedding mat or a cushion. For this reason, metal plates called chutes may be provided, in some cases, above the water tank to receive the filaments before they land on the water of the water tank and to guide them to the water tank.

The chutes, which are inclined, and on the inclined surfaces of which flowed water makes uniform water layers, await the filaments. Part of the filaments extruded from the holes are guided to the water tank with sliding on the inclined surfaces of the chutes while being entangled and thermally bonded on the surfaces of the chutes as described above and at the same time being narrowed toward an inner layer so as to form surface layers with a higher apparent density. At the same time, the outer surfaces of the surface layers are made smooth while sliding on the smooth chutes. Therefore, compared to a netted structure with not-smoothed helices of filaments on its surface, when covering the netted structure for example, bothersome hooking of the filaments to a cover can be prevented and a deterioration of strength due to break of bonding of filaments being hooked and pulled can be also prevented.

Formation of the surface layers of such netted structures relates significantly to the conditions of the water layer and friction of the inclined surfaces of the chutes. Quality of the surface layers depends on these conditions. For example, Japanese Patent No. 4181878 discloses a method of providing water-permeable sheets covering the surfaces of the chutes and supplying cooling water between the surfaces of the chutes and the water-permeable sheets. This method can form a uniform cooling water layer on the surface of the chute by suctioning water with the water-permeable sheet. The formed cooling water layer can buffer the impact of landing of the filaments, and at the same time, friction resistance of the water-permeable sheet can control slide of the filaments so as to form adequate loops (helical and random entangling of the filaments).

PRIOR ART DOCUMENTS

Patent Documents

Patent Document 1: Japanese Patent No. 4181878

SUMMARY OF THE INVENTION

However, in the above described method of covering the chutes with the water-permeable sheets, there have been problems as described below due to wrinkling of the water-permeable sheets or attachment of foreign materials such as rust. Neither formed water layer nor friction can be uniform on wrinkled water-permeable sheets, and the filaments therefore cannot form adequate loops. If attachment of some foreign materials happens, it is necessary to replace the water-permeable sheet itself in order to remove the foreign materials. However, they tend to be neglected because replacement is bothersome, and as a result, foreign materials might get mixed into a netted structure. In order to avoid such a situation, water-permeable sheets must be set carefully. Or it is necessary to replace water-permeable sheets if such a situation occurs. That is, if water-permeable sheets are to be used, these works are inevitably necessary. There has been a problem that these works are bothersome.

To solve the above problems in prior art, the present invention provides an apparatus for manufacturing a netted structure and a method for manufacturing a netted structure that do not need water-permeable sheets and resultant various bothersome works related to the water-permeable sheets.

In view of these problems, in certain embodiments, the invention is directed to an apparatus for manufacturing a netted structure, comprising: a pair of opposing chutes located on both sides of a filament assembly extruded downward along the width direction of said filament assembly and vertical to the thickness direction of said filament assembly, said chutes being inclined so that the distance between each said chute becomes narrower downward and toward the center of said filament assembly; and a pair of water supplying units for supplying cooling water downward on surfaces of said chutes to cool said filament assembly; wherein the surfaces of said chutes are uniformly roughened so that said cooling water spreads all over the surfaces of said chutes and forms cooling water layers; and said cooling water layers receive the filaments in surface parts of said filament assembly to form loops and make the adjacent continuous filaments contact and entangled with each other so as to form surface layers having a higher apparent density and an inner layer located between said surface layers and having a lower apparent density.

In a class of this embodiment, the surfaces of said chutes are roughened by sandblasting.

In another class of this embodiment, each of said chutes has an inclined part which is inclined at a predetermined angle and a guiding part which is made by bending a part of said inclined part downward.

In another class of this embodiment, said inclined parts of said chutes are inclined at an angle in a range of 20 to 70 degrees against the horizontal direction.

In another class of this embodiment, said inclined parts of said chutes are inclined at an angle in a range of 30 to 50 degrees against the horizontal direction.

In another class of this embodiment, said guiding parts of said chutes are inclined at an angle in a range of 70 to 90 degrees against the horizontal direction.

In another class of this embodiment, said guiding parts of said chutes are inclined at an angle in a range of 75 to 85 degrees against the horizontal direction.

In another class of this embodiment, said chutes have a surface roughness in a range of 0.2 to 100 Z, in ten-point average roughness (Rz).

In another class of this embodiment, said chutes have a surface roughness in a range of 0.4 to 25 Z, in ten-point average roughness (Rz).

In another class of this embodiment, the apparatus further comprises a pair of opposing width setting plates provided to intersect with the longitudinal direction of said chutes at the surfaces of said chutes, each said width setting plate having a central horizontal part and inclined parts located on both sides of said horizontal part and adapted to inclination of said chutes on both sides, said horizontal part having a guiding part made by bending a part of said horizontal part downward, and the surfaces of said width setting plates being uniformly roughened.

In another class of this embodiment, the surfaces of said width setting plates are roughened by sandblasting.

In another class of this embodiment, said width setting plates have a surface roughness in a range of 0.2 to 100 Z, in ten-point average roughness (Rz).

In another class of this embodiment, said width setting plates have a surface roughness in a range of 0.4 to 25 Z, in ten-point average roughness (Rz).

In other embodiments, the invention is directed to a method for manufacturing a netted structure, comprising: a cooling water supplying step of supplying cooling water downward on uniformly roughened surfaces of chutes for cooling a filament assembly extruded downward, said chutes being opposed to each other and being located on both sides of said filament assembly along the width direction of said filament assembly and vertical to the thickness direction of said filament assembly, said chutes being inclined so that the distance between each said chute becomes narrower downward and toward the center of said filament assembly; a loop forming step of receiving filaments in surface parts of said filament assembly by said cooling water so as to form loops and make the adjacent continuous filaments contact and entangled with each other; and a dense-and-sparse portions forming step of forming surface layers having a higher apparent density and an inner layer located between said surface layers and having a lower apparent density.

According to the apparatus for manufacturing a netted structure and the method for manufacturing a netted structure of the present invention, works such as attaching or replacing water-permeable sheets are not necessary because water-permeable sheets are not used from the beginning. And generally, maintenances for preventing rust on the surfaces of chutes and the like are necessary for chutes. In the method using water-permeable sheets, bothersome replacement of water-permeable sheets was necessary at maintenance. On the other hand, in the apparatus of the present invention, maintenance can be performed easily because maintenance can be done by only washing the surfaces of the chutes.

DETAILED DESCRIPTION OF THE PREFERRED EMBODIMENTS

First Embodiment

Embodiments of an apparatus for manufacturing a netted structure of the present invention are described below with reference to the accompanied drawings.

Figure 1:
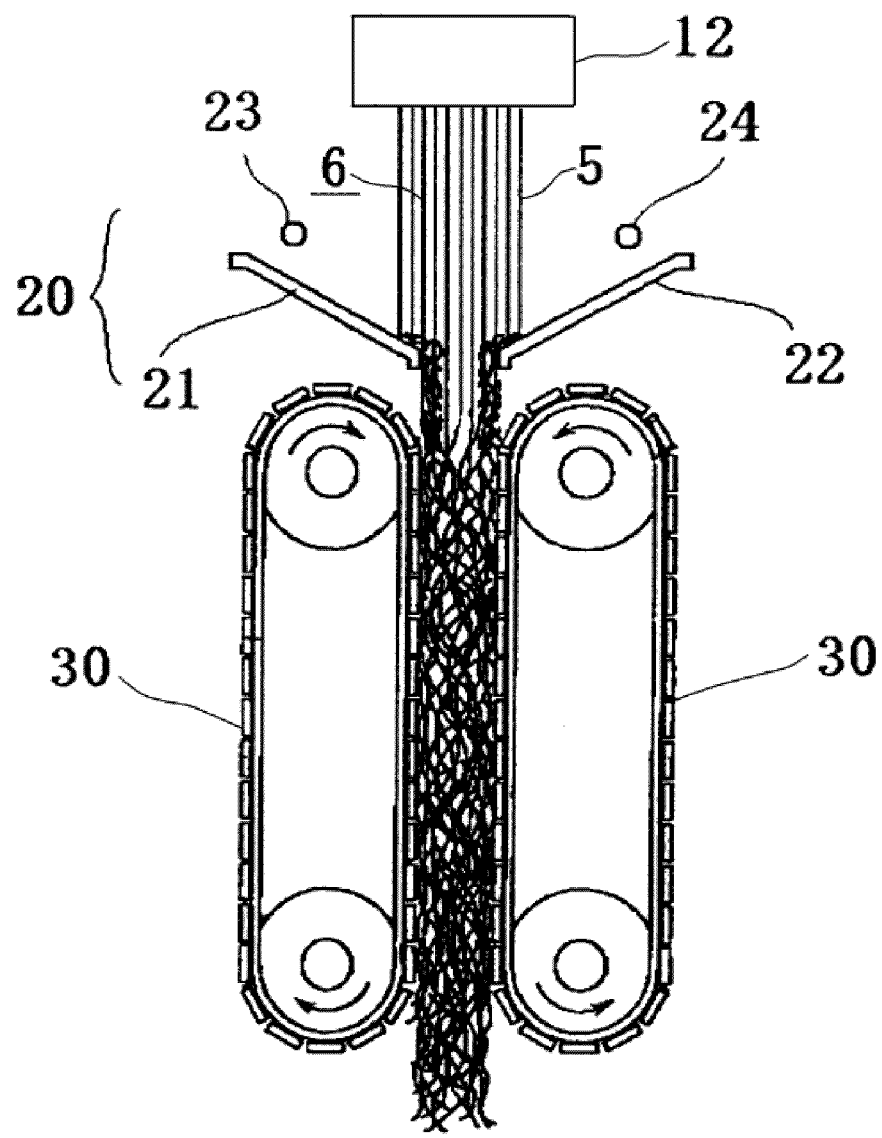
FIG. 1 is an explanatory schematic front view of an apparatus for forming loops in a netted structure of the first embodiment.
Figure 2:
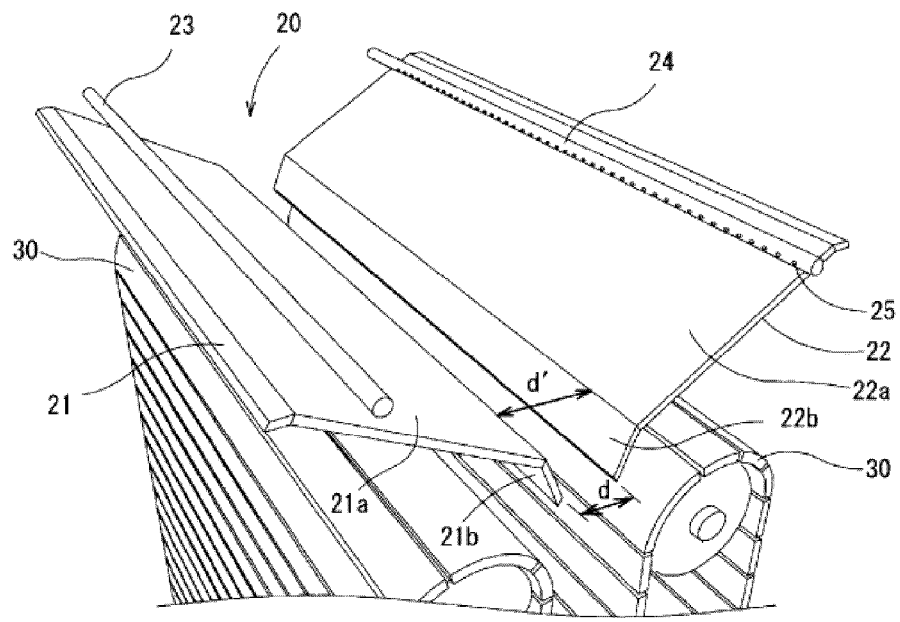
FIG. 2 is a perspective view of the apparatus for forming loops in a netted structure.

First, an apparatus 20 for forming loops in a netted structure in the first embodiment is briefly described with reference to FIGS. 1 and 2. The apparatus 20 for forming loops in a netted structure, which is a part of an apparatus 100 for manufacturing a netted structure, is an apparatus for forming a netted structure 1. FIG. 1 is an explanatory schematic front view of the apparatus 20 for forming loops in a netted structure of the first embodiment. FIG. 2 is a perspective view of the apparatus 20 for forming loops in a netted structure.

As shown in FIG. 1, the apparatus 20 for forming loops in a netted structure includes a pair of opposing chutes 21, 22 and a pair of water supplying units 23, 24 for supplying water on each surface of the chutes 21, 22. The chutes 21, 22 are inclined at predetermined degrees to become lower toward the center of them. As shown in FIG. 2, the chutes 21, 22 include, respectively, an inclined part 21a and a guiding part 21b, and an inclined part 22a and a guiding part 22b. The guiding parts 21b, 22b have a steeper inclination than the inclined parts 21a, 22a. If we call the space between the guiding parts 21b and 22b a valley, the thickness of the netted structure 1 is decided by the width d of the lower end of the valley.

The water supplying units 23, 24 are respectively provided above the higher sides of the inclined surfaces of the chutes 21, 22. The water supplying units 23, 24 are supplied with water from a water source (not shown) and let water out from multiple holes 25 formed all over the units. Water coming out of the water supplying units 23, 24 flows down on the inclined surfaces of the chutes 21, 22, reaches the valley and then falls down to a water tank 40 located below the apparatus 20 for forming loops in a netted structure.

Molten resin filaments 5, which constitute an filament assembly 6 having a thickness a little thicker than the width d' of the upper end of the valley between the chutes 21, 22 and a width not greater than the length in the longitudinal direction of the chutes 21, 22, fall down from above toward the chutes 21, 22 and the valley between them. Thus, part of the filaments 5 in the filament assembly 6 pass through the valley and directly land on the water surface of the water tank 40, while other part of the filaments 5 first land on the chutes 21, 22, slide down the inclined surfaces with the cooling water layers 21c formed on the surfaces of the chutes 21, 22, and then reach the valley and fall down on the water surface of the water tank 40.

In order that the filaments 5 are entangled and thermally bonded adequately in the surface layers 2 (refer to FIG. 4) of the netted structure 1, the filaments 5 must form loops and be bonded to each other while the filaments 5 slide down the inclined surfaces of the chutes 21, 22. The formation of loops and bonding of filaments 5 occur by generating a certain level of friction and water flow of the water layers on the inclined surfaces of the chutes 21, 22 as the result that the filaments 5 are scattered randomly by the friction and the water flow on the inclined surfaces. In order to make the surface layers 2 of the netted structure 1 with uniform formation of loops and bonding of the filaments 5, it is necessary to make the friction resistance of the inclined surfaces of the chutes 21, 22 uniform, to uniformly spread water supplied from the water supplying units 23, 24 all over the inclined surfaces of the chutes 21, 22, and thus to make the filaments 5 randomly scatter at any place on the inclined surfaces of the chutes 21, 22 for forming loops and generating bonds in the filaments. In the present invention, forming of loops fundamentally means bonding of one curled filament 5 at a cross point just after the filament 5 makes a circuit, however, bonding among each of adjacent filaments 5 also occurs at the same time. These actions occur randomly, and thus the apparatus and method for manufacturing a netted structure which includes non-loop-like part are also included in the scope of the invention.

The chutes 21, 22 are made of metal such as stainless steel, for example. Processed metal surfaces are generally smooth with almost no friction. If filaments are slid on such bare metal surfaces with water flowing thereon, the filaments reach the water tank 40 with the water flow without formation of loops or bonding of filaments.

To avoid this, the prior art method has utilized friction resistance of water-permeable sheets. That is, in the method, water-permeable sheets are provided on the surfaces of chutes to realize the above described friction and water flow, and cooling water is supplied between the surfaces of the chutes and the water-permeable sheets. However, this method has a problem that attachment work and replacement work of the water-permeable sheets are bothersome. Additionally, if the water-permeable sheets are wrinkled, friction cannot be generated uniformly on the inclined surfaces of the chutes even though the water-permeable sheets themselves have a proper friction. This is also a problem in this method.

To solve these problems, the surfaces of the chutes 21, 22 are uniformly roughened by sandblasting in the first embodiment. Adequate friction resistance is generated on the surfaces by sandblasting the surfaces of the chutes 21, 22. Sandblasting can be performed mechanically, can generate friction uniformly on the surfaces of the chutes 21, 22, and needs no measure against wrinkling, as water-permeable sheets are not used from the beginning.

Moreover, metal has its inherent water repellency. If water is flowed on a bare metal surface, some parts do not get wet while some parts have concentrated surge water flow thereon.

To avoid this, and to spread water uniformly, the prior art method has utilized water-absorbing property of water-permeable sheets. However, the water-permeable sheets cannot form uniform water layer on the inclined surfaces of the chutes, if wrinkling occurs. The surfaces of the chutes 21, 22 are therefore sandblasted, in this embodiment, to eliminate inherent water repellency of metal. Once water repellency is eliminated, flowed water can spread uniformly on the inclined surfaces to form cooling water layers 21c even if they are bare metal surfaces. Measures for wrinkling are not necessary as water-permeable sheets are not used from the beginning.

As sandblasting eliminates the necessity of the water-permeable sheets, it also eliminates the necessity of works such as attaching and replacing the water-permeable sheets. Moreover, maintenance for preventing rust and the like on the surfaces of the chutes 21, 22 are necessary. In the prior art method of using water-permeable sheets, bothersome replacement of water-permeable sheets was necessary for the maintenance. On the contrary, in the first embodiment, it is sufficient to only easily washing the surfaces of the chutes 21, 22 for the maintenance, which can be done every day if needed.

As described above, in the first embodiment, the surfaces of the chutes 21, 22 are uniformly roughened by sandblasting so that inherent water repellency of metal is eliminated to generate uniform cooling water layers 21c on the surfaces of the chutes 21, 22 and that adequate friction resistance is generated. As a result, water-permeable sheets became unnecessary and thus it became possible to eliminate various bothersome works related to the water-permeable sheets. Moreover, it is possible to avoid attachment of foreign materials and thus to avoid mixing of foreign materials into the netter structure 1 as the maintenance of the chutes 21, 22 can be done easily and can be done everyday if needed.

In the first embodiment, sandblasting is used for roughening uniformly. However, method of roughening is not limited to sandblasting only if the surfaces can be roughened uniformly.

Figure 3:
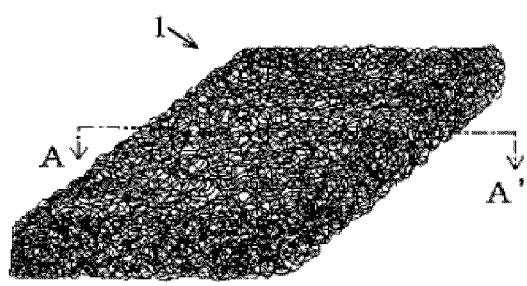
FIG. 3 is a perspective view of a netted structure of the first and second embodiments.
Figure 4:
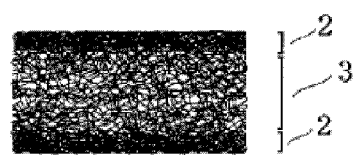
FIG. 4 is a sectional view of the netted structure of the first embodiment along the A-A' line.

The netted structure 1 is described below in detail with reference to FIGS. 3 and 4. The netted structure 1 has various applications such as a cushion and a buffer material. However, in this embodiment, an example of the netted structure 1 used as a bedding mat is explained. FIG. 3 is a perspective view of the netted structure 1, and FIG. 4 is a sectional view of the netted structure 1 along the A-A' line. As shown in FIG. 3, the netted structure 1 is in a rectangular solid shape having a predetermined length, width and thickness like general bedding mats. Especially, the thickness of the netted structure 1 is determined by the width of the valley between the chutes 21, 22 as described above.

As shown in FIG. 4, the cross-section of the netted structure 1 is constituted of surface layers 2 having a higher apparent density and an inner layer 3 having a lower apparent density. It is preferable that the filaments 5 in the boundary regions between the surface layers 2 and the inner layer 3 are bonded to each other. Difference in apparent density between the surface layers 2 and the inner layer 3 and the sufficient bonding of the layers at the boundaries are generated due to the operation of the apparatus 20 for forming loops in a netted structure, and they closely relate to comfort and permanent set-in fatigue resistance needed in bedding mats.

Figure 5:
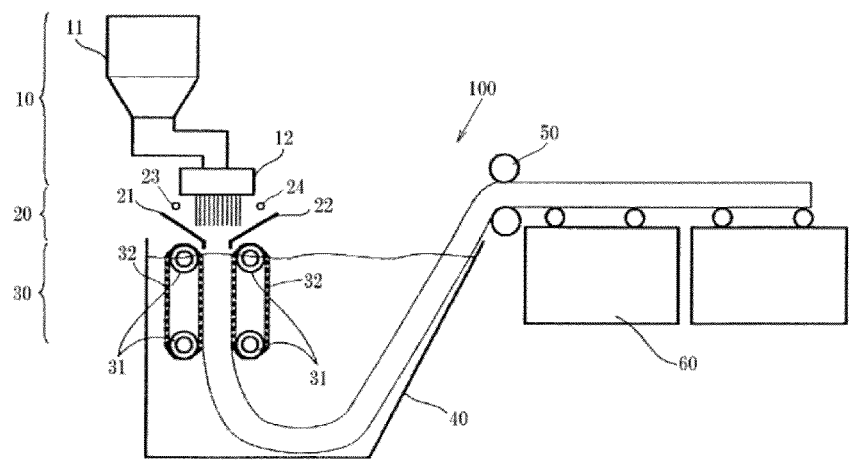
FIG. 5 is an explanatory schematic front view of an apparatus for manufacturing a netted structure.

An apparatus 100 for manufacturing a netted structure is explained below with reference to FIG. 5. FIG. 5 is an explanatory schematic view of the apparatus for manufacturing a netted structure. As shown in FIG. 5, the apparatus 100 for manufacturing a netted structure includes an extruder 10, an apparatus 20 for forming loops in a netted structure, a pair of drawing-down units 30, a water tank 40, a pair of wind-up rolls 50 and a bench 60.

The extruder 10 is provided with a hopper 11 and a forming die 12. The hopper 11 melts and kneads fed resin at a predetermined temperature and feeds the molten resin to the forming die 12. The forming die 12 extrudes the molten resin as filaments 5 at a predetermined extruding rate. More specifically, the bottom face of the forming die 12 is a metal plate having a number of holes of a predetermined diameter, and the resin is extruded from the holes as filaments 5 to form as a whole a filament assembly 6 including the filaments 5 corresponding to locations of said holes.

The apparatus 20 for forming loops in a netted structure is provided with a pair of chutes 21, 22, and a pair of water supplying units 23, 24. The apparatus 20 for forming loops in a netted structure receives a part of filaments 5 extruded from the forming die 12 before they land on the water surface of the water tank 40, and narrows the thickness of the filament assembly 6 to form the surface layers 2 of the netted structure 1.

Figure 6:
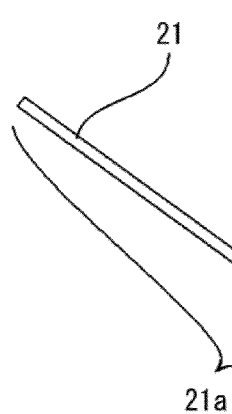
FIG. 6A is an explanatory schematic front view of chutes.
FIG. 6B is an enlarged view of the part enclosed by a dotted line in FIG. 6A.
Figure 6:
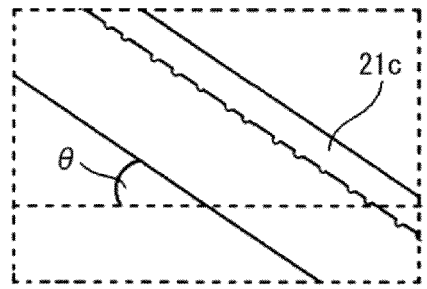

The chute 21 is made of stainless steel for example, and, in particular as shown in FIG. 6, includes an inclined part 21a constituting an inclined surface having a predetermined inclination angle $\theta$, and a guiding part 21b having a steeper inclination angle $\phi$ than that of the inclined part 21a. The chute 21 may be made of a copper plate which has a good bending workability when the chute 21 is made in a special shape such as a rounded shape. FIG. 6A is an explanatory schematic front view of the chute. FIG. 6B is an enlarged view of the part enclosed by a dotted line in FIG. 6A. The explanation of the chute 22 is omitted hereinbefore and hereinafter because it is similar to that of the chute 21.

The inclined part 21a has an inclination angle preferably in a range of 20 to 70 degrees and more preferably in a range of 30 to 50 degrees against the horizontal direction. The inclination angle $\theta$ is equal to 40 degrees in this embodiment. Experimental results related to the inclination angle are described later. As the surface of the inclined part 21a and the guiding part 21b are roughened by sandblasting, a cooling water layer 21c is formed uniformly on the surface of the chute 21 as shown in the enlarged view in FIG. 6. The chute 21 has a surface roughness preferably in a range of 0.2 to 100 Z, and more preferably in a range of 0.4 to 25 Z in ten-point average roughness (Rz). The surface roughness Rz is equal to 6.3 in this embodiment. Experimental results related to the surface roughness are also described later. Ten-point average roughness (Rz) is defined by JIS (Japanese Industrial Standards) as "a value in micrometers determined by taking a part of roughness curve out by a reference length in the direction of an average line, and calculating the sum of the average of absolute values of altitudes of the highest five peaks and the average of absolute values of altitudes of the lowest five bottoms measured from the average line of the taken out part in the depth magnification direction".

Figure 7:
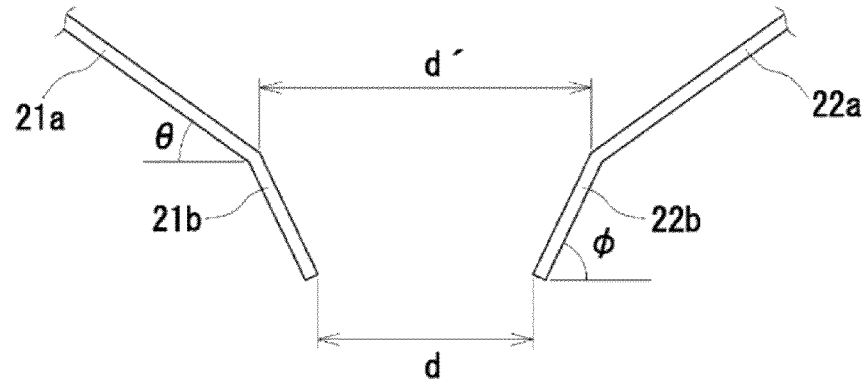
FIG. 7 is a schematic front view of the chutes for explaining angles of the chutes.

As shown in FIG. 7, the guiding part 21b has an angle $\phi$ against the horizontal direction, which is bigger than $\theta$ (the relation $\phi > \theta$ is also applicable to the inclination angle of the guiding part 22b and the inclination angle of the inclined part 22a) and is preferably in a range of 70 to 90 degrees and more preferably in a range of 75 to 85 degrees. In this embodiment, $\phi$ is set to 80 degrees. The guiding part 21b can increase speed of falling and sliding down of the filaments 5, and can also ensure and regulate cooling time for solidifying and fixing the entanglement of the molten filaments 5. Moreover, the chute 21, which bears considerable load of the weight of the filament assembly 6 during manufacture, can be strengthened by providing the guiding part 21b. The plate thickness of the chute 21 can be thus reduced, leading to economical advantage and reduced weight.

Although the above mentioned sandblasting is also applied to the guiding part 21b, the areas of the valley between the guiding part 21b and the guiding part 22b, namely the areas of 5 mm from the respective lowest ends of the guiding parts 21b and 22b are preferably not sandblasted. If sandblasting is applied to whole guiding part 21b including the lowest end area, the filaments 5 might stick to the guiding part 21b. This would work against achieving a netted structure 1 of a stable thickness.

The water supplying unit 23 is substantially in a cylindrical form extending in a longitudinal direction of the chute 21 and has multiple holes formed all over it. The water supplying unit 23, which is supplied with water from a water source (not shown), lets water out from the multiple holes. As the result, water flows on the surface of the chute 21. Water spreads all over the surface uniformly without being repelled and forms a cooling water layer 21c because inherent water repellency of metal is eliminated by roughening the inclined part 21a of the chute 21 by sandblasting. The explanation of the water supplying unit 24 is omitted because it is similar to that of the water supplying unit 23.

Part of the filaments 5 extruded from the forming die 12 move on the inclined part 21a after landing on the inclined part 21a while being randomly scattered by a water flow of the cooling water layer 21c and friction of the surface of the inclined part 21a generated by sandblasting, and are then guided by the guiding part 21b so as to land on the water surface of the water tank 40. While sliding down the inclined part 21a, the filaments 5 bond to each other with forming loops. The surface layers 2 are thus formed. If the filaments 5 are cooled too much, the surface layers 2 and the inner layer 3 are not bonded and the netted structure 1 becomes less resistant to permanent set-in fatigue. Accordingly, it is desirable to decide a proper inclination angle of the inclined part 21a considering conditions of water flow and friction of the surface of the inclined part 21a. The explanation of the chute 22 and the water supplying unit 24 is omitted because it is similar to this explanation.

Each of the drawing down units 30 includes a pair of rollers 31 located one above the other and an endless belt 32 set on the rollers 31. The rollers 31 are rotated at a predetermined angular speed by rotation energy of a motor (not shown), and the endless belt 32 is thereby rotated continuously around the rollers 31 at a predetermined speed. The filaments 5 will float in the water of the water tank 40, as the specific gravity of the filaments 5 is lower. That is why the drawing down units 30 are set in the water tank 40 to draw down the filaments by the endless belts 32 of the drawing down units 30 and thus to form a continuous netted structure.

The wind-up rolls 50 wind up the continuous netted structure coming out of the water tank 40 and guide it to the bench 60. Workers then cut the continuous netted structure guided to the bench 60 at a predetermined length to make the netted structure 1.

The experimental results related to surface roughness of the chutes 21, 22 are described below. To know the effect of surface roughness of the chutes 21, 22 on the degree of contacting and bonding of loops in the netted structure 1, netted structures 1 having a thickness of 3.5 cm were formed with conditions of different surface roughnesses of the chutes 21, 22. The formed netted structures were cut to 3 cm width to be formed into samples. Tensile strength of the samples was measured to make an evaluation. Low tensile strength means low degree of contacting and bonding and has an effect on the repeated compressive strength, making the netted structure easily submit to permanent set-in fatigue. Product strength of the netted structure 1 is influenced by material strength of the filaments 5 and bonding strength among the filaments 5. And the bonding strength can be generally estimated by tensile strength. It is because bonding strength tends to be smaller than material strength and thus break of the bonded points among the filaments 5 represents tensile yield stress better than tensile failure of the filaments 5 themselves does. If tensile failure of the filaments 5 themselves occurs earlier than break of the bonded points, it means that the netted structure 1 is evaluated to have enough product strength as far as manufacturing process is concerned. Although product strength of the netted structure 1 can be also measured by other tests such as repeated compression residual strain tests, these tests are influenced not only by bonding strength but also by material strength. Tensile strength is therefore measured for more directly evaluating bonding strength which might be affected by conditions of manufacturing process, Conditions of the Chutes 21, 22
Inclination angle $\theta$ of the inclined parts 21a, 22a against the horizontal direction: 40 degrees
Inclination angle $\phi$ of the guiding parts 21b, 22b against the horizontal direction: 80 degrees
Amount of water supplied to the chutes 21, 22: 12 L/min per 1 m of each water supplying unit 23 or 24.
Measurement Method of Surface Roughness
Based on JIS B 0601:1982
Conditions of Tensile Test
Based on JIS L 1096 (test method for general fabric), method A (strip method)
Test speed: 200 mm/min
Initial test length (distance between chucks of the tensile testing machine): 200 mm
Test number: 5 samples

TABLE 1

| Surface roughness | Average of maximum point loads N |
|---|---|
| 0.2Z | 11.3 |
| 0.4Z | 12.6 |
| 1.6Z | 19.2 |
| 6.3Z | 18.6 |
| 25Z | 18.8 |
| 50Z | 13.0 |
| 100Z | 10.6 |

The result of the experiment shows that the netted structures 1 have a sufficient tensile strength and thus have a sufficient degree of contacting and bonding when surface roughness (ten-point average roughness Rz) is in a range of 0.2 to 100 Z, and particularly in a range of 1.6 to 25 Z.

Next, the experimental results of the relation between the surface roughness of the chutes 21, 22 and the tensile strength of the netted structures 1, when inclination angle $\theta$ of the chutes 21, 22 is set to 50 degrees, are described below.

Conditions of the Chutes 21, 22
Inclination angle $\theta$ of the inclined parts 21a, 22a against the horizontal direction: 50 degrees
Inclination angle $\phi$ of the guiding parts 21b, 22b against the horizontal direction: 80 degrees
Amount of water supplied to the chutes 21, 22: 12 L/min per 1 m of each water supplying unit 23 or 24.
Measurement Method of Surface Roughness
Based on JIS B 0601:1982
Conditions of Tensile Test
Based on JIS L 1096 (test method for general fabric), method A (strip method)
Test speed: 200 mm/min
Initial test length (distance between chucks of the tensile testing machine): 200 mm
Test number: 5 samples

TABLE 2

| Surface roughness | Average of maximum point loads N |
|---|---|
| 0.2Z | 13.0 |
| 0.4Z | 18.9 |
| 1.6Z | 18.7 |
| 6.3Z | 18.5 |
| 25Z | 18.3 |
| 50Z | 13.7 |

The result of the experiment shows that the netted structures 1 have a sufficient tensile strength when surface roughness (ten-point average roughness Rz) is 0.4 Z.

Next, the experimental results related to inclination angle $\theta$ of the inclined parts 21a, 22a of the chutes 21, 22 are described below. Holding time of the filaments 5 changes depending on the inclination angle $\theta$. To know the effect of inclination angle $\theta$ of the chutes 21, 22 against the horizontal direction on the degree of contacting and bonding of loops in the netted structure 1, netted structures 1 having a thickness of 3.5 cm were formed with conditions of different inclination angles $\theta$. The formed netted structures were cut to 3 cm width to be formed into samples. Tensile strength of the samples was measured to make an evaluation. The angle between the guiding parts 21b, 22b and the inclined parts 21a, 22a is adjusted with the change in the inclination angle $\theta$ of the inclined parts 21a, 22a so as to maintain the inclination angle $\phi$ of the guiding parts 21b, 22b against the horizontal direction at 80 degrees.

Conditions of the Chutes 21, 22
Surface roughness of the chutes 21, 22: 6.3 Z
Amount of water supplied to the chutes 21, 22: 12 L/min per 1 m of each water supplying unit 23 or 24.
Measurement Method of Surface Roughness
Based on JIS B 0601:1982
Conditions of Tensile Test
Based on JIS L 1096 (test method for general fabric), method A (strip method)
Test speed: 200 mm/min
Initial test length (distance between chucks of the tensile testing machine): 200 mm
Test number: 5 samples

TABLE 3

| Angle | Average of maximum point loads N |
|---|---|
| 20 | 13.6 |
| 30 | 18.1 |
| 40 | 20.1 |
| 50 | 18.3 |
| 60 | 13.4 |
| 70 | 12.6 |

The result of the experiment shows that the netted structures 1 have a sufficient tensile strength and thus have a sufficient degree of contacting and bonding when inclination angle $\theta$ against the horizontal direction is in a range of 20 to 70 degrees, and particularly in a range of 30 to 50 degrees. In these ranges, none of water repelling on the surfaces of the chutes 21, 22, linking, imperfect loops or abnormality in thickness occurs. If the inclination angle $\theta$ is steeper than 70 degrees, extruded filaments 5 cannot be cooled sufficiently and tend to be bonded abnormally, and thus the resultant netted structure cannot be regulated to have uniform thickness. It also makes tensile strength low and has an effect on the repeated compressive strength, making the netted structure easily submit to permanent set-in fatigue.

Finally, the experimental results related to amount of water supplied to the chutes 21, 22 are described below. To know the effect of amount of water supplied to the chutes 21, 22 on the degree of contacting and bonding of loops in the netted structure 1, netted structures were formed with conditions of different amounts of water supplied to the chutes 21, 22. The experiment was carried with conditions of different amounts of water per 1 m of each water supplying unit 23 or 24 with holes of 1 mmφ formed at an interval of 10 mm.

Conditions of the Chutes 21, 22
Surface roughness of the chutes 21, 22: 6.3 Z
Inclination angle θ of the inclined parts 21a, 22a against the horizontal direction: 40 degrees.
Inclination angle φ of the guiding parts 21b, 22b against the horizontal direction: 80 degrees
Measurement Method of Surface Roughness
Based on JIS B 0601:1982

TABLE 4

| Amount of water L/min·m | Formed water layer | Netted structure |
|---|---|---|
| 2 | sparse | part of filaments are not cooled and agglomerated |
| 5 | almost uniform | netted structure is formed well |
| 12 | uniform | netted structure is formed well |
| 20 | almost uniform | netted structure is formed well |
| 30 | not uniform with difference in water speed | thickness is not uniform |

According to this experiment, when the water amount is 2 L/min·m, netted structures cannot be uniform because part of extruded filaments 5 are not cooled sufficiently and thus part of filaments are not bonded in loops but get agglomerated. When the water amount is not less than 30 L/min·m, netted structure cannot be uniform because filaments are forcibly washed out and thus the thickness of the netted structure 1 becomes nonuniform. When the water amount is 5 L/min·m, 12 L/min·m and 20 L/min·m, the inclined parts 21a, 22a and the guiding parts 21b, 22b had a good hydrophilicity and the netted structure 1 could be formed well. Considering the above and the economical aspect, 5 to 20 L/min·m is preferable.

As described above, in the first embodiment, by sandblasting the surfaces of the chutes 21, 22, uniform friction resistance is generated on the surfaces and inherent water repellency of metal is eliminated. This makes possible to form uniform cooling water layers 21c on the surfaces of chutes 21, 22. And filaments 5 are scattered randomly on the inclined surfaces by the water flow and friction so that formation of loops and bonding occur. Moreover, compared to the prior art method of using water-permeable sheets, bothersome works of attaching and replacing the water-permeable sheets can be omitted as the water-permeable sheets are not necessary from the beginning. Further, maintenance can be done by only washing the surfaces of the chutes 21, 22 easily, so maintenance can be done everyday if needed.

Second Embodiment

Figure 8:
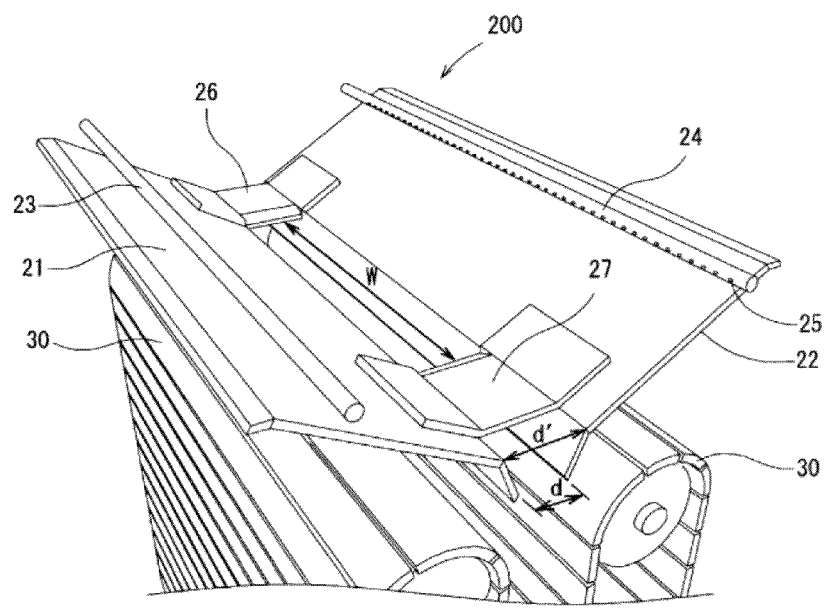
FIG. 8 is an explanatory schematic perspective view of an apparatus for forming loops in a netted structure of the second embodiment.

Next, an apparatus 200 for forming loops in a netted structure in the second embodiment is described. An apparatus 200 for forming loops in a netted structure in the second embodiment is briefly described with reference to FIG. 8. The apparatus 200 for forming loops in a netted structure is an apparatus for forming a netted structure 1 having side surface layers 4 of a higher apparent density than that of an inner layer 3 (refer to FIG. 10). FIG. 8 is an explanatory schematic view of the apparatus 200 for forming loops in a netted structure of the second embodiment. Only the elements which are different from the first embodiment are explained below and explanations of similar elements are omitted by using the same reference numbers as the first embodiment.

As shown in FIG. 8, the apparatus 200 for forming loops in a netted structure includes a pair of opposing chutes 21, 22 and a pair of water supplying units 23, 24 for supplying water on each surface of the chutes 21, 22 similar to the first embodiment, and further includes a pair of opposing width setting plates 26, 27 provided to intersect with the longitudinal direction of said chutes 21, 22. The thickness of the netted structure 1 is decided by the width d of the lower end of the valley between the chutes 21, 22 similar to the first embodiment, and additionally the width of the netted structure 1 is decided by the distance w between the width setting plates 26, 27.

Conventionally, water-permeable sheets are used to the width setting plates 26, 27 for spreading water flowing from the chutes 21, 22 uniformly on the surfaces of width setting plates 26, 27. However, in the method of using water-permeable sheets, as is the case with the chutes 21, 22, there have been problems such as bothersome works of attaching and replacing of the water-permeable sheets due to wrinkling and attachment of foreign materials.

Therefore, the width setting plates 26, 27, the surfaces of which are roughened by sandblasting are provided in the second embodiment. The width setting plates 26, 27 are also made of metal such as stainless steel and generally have inherent water repellency of metal as is the case with the chutes 21, 22. If water is flowed on such bare metal surfaces, some parts of the surfaces do not get wet and filaments 5 do not fall to the water tank with water flow on such parts.

The surfaces of the width setting plates 26, 27 are therefore sandblasted to eliminate inherent water repellency of metal. Once water repellency is eliminated, flowed water can spread on the inclined surfaces even if they are bare metal surfaces. Filaments 5 fall to the water tank with water flow wherever on the width setting plates 26, 27 the filaments 5 land. As with the chutes 21, 22, the width setting plates 26, 27 also need maintenance to prevent rust and the like. Compared to the method using water-permeable sheets, which needs bothersome replacement of the water-permeable sheets for maintenance, maintenance can be done by only washing the surfaces of the width setting plates 26, 27 easily in this embodiment, so maintenance can be done everyday if needed.

Figure 9:
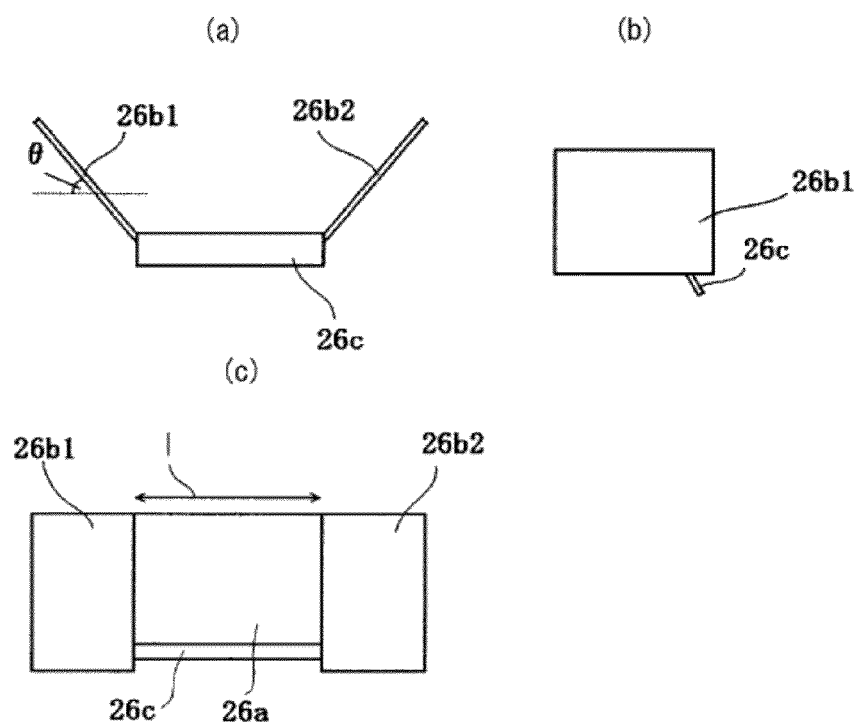
FIG. 9A is an explanatory schematic front view of a width setting plate.
FIG. 9B is an explanatory schematic side view of the width setting plate.
FIG. 9C is an explanatory schematic plan view of the width setting plate.

The width setting plates 26, 27 are described in detail with reference to FIG. 9. FIG. 9A is a front view of the width setting plate 26, FIG. 9B is a side view thereof, and FIG. 9C is a plan view thereof. The width setting plate 26 has a central horizontal part 26a, inclined parts 26b1, 26b2 located on both sides of said horizontal part 26a, and a guiding part 26c made by bending a part of said horizontal part 26a downward.

The inclined parts 26b1, 26b2 should have the same inclination angle θ as that of the chutes 21, 22. Water flowing on the surfaces of the chutes 21, 22 thereby floods the inclined parts 26b1, 26b2. The horizontal part 26a should have the same width l (el) as the width d' of the upper end of the valley between the chutes 21, 22. It is desirable that the guiding part 26c has an angle against the horizontal direction in a range of 0 to 90 degrees, and preferably in a range of 20 to 70 degrees.

It is also desirable that the area of 5 mm from the lowest end of the guiding part 26c is not sandblasted.

The width setting plate 26 should have a thickness thinner than that of cooling water layers 21c formed on the surfaces of the chutes 21, 22. For example, the width setting plate 26 has a thickness of about 0.3 to 2.0 mm. The thinner the width setting plate 26 is, the more water flowing on the surfaces of the chutes 21, 22 flows into the width setting plate 26. Water amount from the water supplying units 23, 24 should be always adjusted so that water spreads uniformly on the surface of the width setting plate 26 even if it is thin enough. The explanation of the width setting plate 27 is omitted because it is similar to that of the width setting plate 26.

Figure 10:
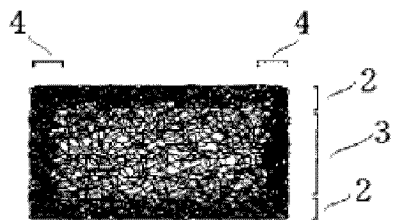
FIG. 10 is a sectional view of the netted structure of the second embodiment along the A-A' line.

The netted structure 1 of the second embodiment is described in detail below. An example of netted structure used as a bedding mat is explained here also as is the case with the first embodiment. FIG. 10 is a sectional view of the netted structure 1 along the A-A' line in FIG. 3. FIG. 3 is used in common as the perspective view of the netted structure 1 of the second embodiment is similar to that of the first embodiment.

As shown in FIG. 3, the netted structure 1 is in a rectangular solid shape having a predetermined length, width and thickness like general bedding mats. The thickness of the netted structure 1 is determined by the width d of the lower end of the valley between the chutes 21, 22, and the width is determined by the distance w of the width setting plates 26, 27 as described above.

As shown in FIG. 10, the cross-section of the netted structure 1 of the second embodiment is constituted of surface layers 2 and side surface layers 4 having a higher apparent density and an inner layer 3 having a lower apparent density. It is preferable that the filaments 5 in the boundary regions among the surface layers 2, the inner layer 3 and the side surface layers 4 are bonded to each other. Difference in apparent density among the surface layers 2, the inner layer 3 and the side surface layers 4 and the sufficient bonding of the layers at the boundaries are generated due to the operation of the apparatus 200 for forming loops in a netted structure, and they closely relate to comfort and permanent set-in fatigue resistance needed in bedding mats.

As described above, in the second embodiment, the surfaces of the width setting plates 26, 27 are roughened by sandblasting so that inherent water repellency of metal is eliminated and water flowing from the chutes 21, 22 spreads all over the surface of the width setting plates 26, 27 uniformly. As a result, water-permeable sheets became unnecessary and thus it became possible to eliminate various bothersome works related to the water-permeable sheets

INDUSTRIAL APPLICABILITY

The apparatus for manufacturing a netted structure of the present invention is used in order to receive part of filaments in a molten resin filament assembly before they land on the water surface of the water tank and narrow the thickness of the filament assembly so as to form the surface layers of the netted structure. It is particularly useful for eliminating various bothersome works related to water-permeable sheets because it does not need the water-permeable sheets.

REFERENCE NUMBERS 1 a netted structure
2 surface layers
3 an inner layer
4 side surface layers
10 an extruder
20, 200 apparatuses for forming loops in a netted structure
21, 22 chutes
21a, 22a inclined parts
21b, 22b guiding parts
23, 24 water supplying units
26, 27 width setting plates
26a a horizontal part
26b1, 26b2 inclined parts
26c a guiding part
30 drawing-down units
40 a water tank
50 wind-up rolls
60 a bench
100 an apparatus for manufacturing

The invention claimed is:

1. A method for manufacturing a netted structure, comprising:
    a filament assembly step comprising extruding downward a molten resin as a plurality of filaments, wherein said plurality of filaments forms a filament assembly having a width and a thickness;
    a cooling water supplying step comprising supplying cooling water downward on uniformly roughened metal surfaces of chutes for cooling said filament assembly extruded downward, said chutes being opposed to each other and being located on both sides of said filament assembly along the width direction of said filament assembly and vertical to the thickness direction of said filament assembly, and said chutes being inclined so that the distance between each said chute becomes narrower downward and toward the center of said filament assembly;
    a loop forming step comprising receiving a first part of the filaments of said filament assembly on said roughened metal surfaces of said chutes supplied with said cooling water to form loops and make adjacent filaments within said first part of the filaments contact and entangled with each other; and
    a dense-and-sparse portions forming step for forming surface layers having a higher apparent density and an inner layer located between said surface layers and having a lower apparent density, said dense-and-sparse portions forming step comprising:
        landing a second part of the filaments of said filament assembly directly on a water surface of a water tank; and
        having said first part of the filaments of said filament assembly received on said roughened metal surfaces of said chutes fall down on the water surface of said water tank.

* * * * *